United States Patent
Chen et al.

(10) Patent No.: US 12,488,430 B2
(45) Date of Patent: Dec. 2, 2025

(54) TRAINING MASKED AUTOENCODERS FOR IMAGE INPAINTING

(71) Applicant: Microsoft Technology Licensing, LLC, Redmond, WA (US)

(72) Inventors: Dongdong Chen, Redmond, WA (US); Jianmin Bao, Beijing (CN); Ting Zhang, Beijing (CN); Lu Yuan, Redmond, WA (US); Dong Chen, Redmond, WA (US); Fang Wen, Beijing (CN); Xiaoyi Dong, Beijing (CN)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/000,285

(22) PCT Filed: May 19, 2022

(86) PCT No.: PCT/CN2022/093897
§ 371 (c)(1),
(2) Date: Nov. 29, 2022

(87) PCT Pub. No.: WO2023/221043
PCT Pub. Date: Nov. 23, 2023

(65) Prior Publication Data
US 2024/0221128 A1     Jul. 4, 2024

(51) Int. Cl.
*G06T 5/60*     (2024.01)
*G06T 5/77*     (2024.01)
(Continued)

(52) U.S. Cl.
CPC .................. *G06T 5/60* (2024.01); *G06T 5/77* (2024.01); *G06T 7/11* (2017.01); *G06V 10/40* (2022.01);
(Continued)

(58) Field of Classification Search
CPC ... G06T 5/60; G06T 7/11; G06T 2207/20021; G06T 2207/20081; G06V 10/40; G06V 10/774; G06V 10/766; G06V 5/77
See application file for complete search history.

(56) References Cited

U.S. PATENT DOCUMENTS

| | | | |
|---|---|---|---|
| 10,776,662 B2 * | 9/2020 | Sigal | G06F 18/214 |
| 11,501,415 B2 * | 11/2022 | Yi | G06T 3/4046 |

(Continued)

OTHER PUBLICATIONS

Dong, et al., "PeCo: Perceptual Codebook for BERT Pre-training of Vision Transformers", In repository of arXiv:2111.12710v1, Nov. 24, 2021, 13 Pages.
(Continued)

*Primary Examiner* — Gregory M Desire
(74) *Attorney, Agent, or Firm* — Foley IP Law, PLLC

(57) ABSTRACT

The disclosure herein describes training an encoder network to inpaint images with masked portions. A primary encoding process is used to encode a visible portion of a masked input image into encoded token data. The encoded token data is then decoded into both pixel regression output and feature prediction output, wherein both outputs include inpainted image data associated with the masked portion of the masked input image. A pixel regression loss is determined using the pixel regression output and pixel data of an unmasked version of the masked input image. A feature prediction loss is determined using the feature prediction output and ground truth encoding output of the unmasked version of the masked input image. The primary encoding process is then trained using the pixel regression loss and the feature prediction loss, whereby the primary encoding process is trained to encode structural features of input images into encoded token data.

20 Claims, 6 Drawing Sheets

(51) Int. Cl.
- *G06T 7/11* (2017.01)
- *G06V 10/40* (2022.01)
- *G06V 10/766* (2022.01)
- *G06V 10/774* (2022.01)

(52) U.S. Cl.
CPC ......... *G06V 10/766* (2022.01); *G06V 10/774* (2022.01); *G06T 2207/20021* (2013.01); *G06T 2207/20081* (2013.01)

(56) References Cited

U.S. PATENT DOCUMENTS

| | | | |
|---|---|---|---|
| 11,687,835 B2 * | 6/2023 | Fan | G06N 3/045 |
| | | | 382/159 |
| 12,272,031 B2 * | 4/2025 | Singh | G06V 10/774 |
| 12,277,630 B2 * | 4/2025 | Aggarwal | G06T 7/13 |
| 12,354,011 B2 * | 7/2025 | Biswas | G06N 3/044 |

OTHER PUBLICATIONS

Liu, et al., "Reduce Information Loss in Transformers for Pluralistic Image Inpainting", Retrieved From: https://arxiv.org/pdf/2205.05076.pdf#:~:text=As%20shown%20in%20the%20top,re%2D%20sult%20by%20feeding%20it, May 15, 2022, 18 Pages.

"International Search Report and Written Opinion Issued in PCT Application No. PCT/CN22/093897", Mailed Date: Nov. 25, 2022, 14 Pages.

* cited by examiner

TRAINING MASKED AUTOENCODERS FOR IMAGE INPAINTING

BACKGROUND

Self-supervised representation learning, which aims to learn transferrable representations from unlabeled data, has been a longstanding problem in the area of computer vision. Recent progress has demonstrated that large-scale self-supervised representation learning leads to significant improvements over the supervised learning counterpart on challenging datasets. Particularly, Masked Image Modeling (MIM) in self-supervised pre-training for vision transformers has shown improved performance in computer vision tasks. However, some such techniques are limited by pixel-level prediction targets, and they waste training effort and model capability by causing the model to "memorize" target-specific information of training data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for training an encoder network to inpaint images with masked portions is described. A primary encoding process is used to encode a visible portion of a masked input image into encoded token data. The encoded token data is then decoded into both pixel regression output and feature prediction output, wherein both outputs include inpainted image data associated with the masked portion of the masked input image. A pixel regression loss is determined using the pixel regression output and pixel data of an unmasked version of the masked input image. A feature prediction loss is determined using the feature prediction output and ground truth encoding output of the unmasked version of the masked input image, wherein the ground truth encoding output is generated by a ground truth momentum encoding process. The primary encoding process is then trained using the pixel regression loss and the feature prediction loss, whereby the primary encoding process is trained to encode structural features of input images into encoded token data.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Figure 1:
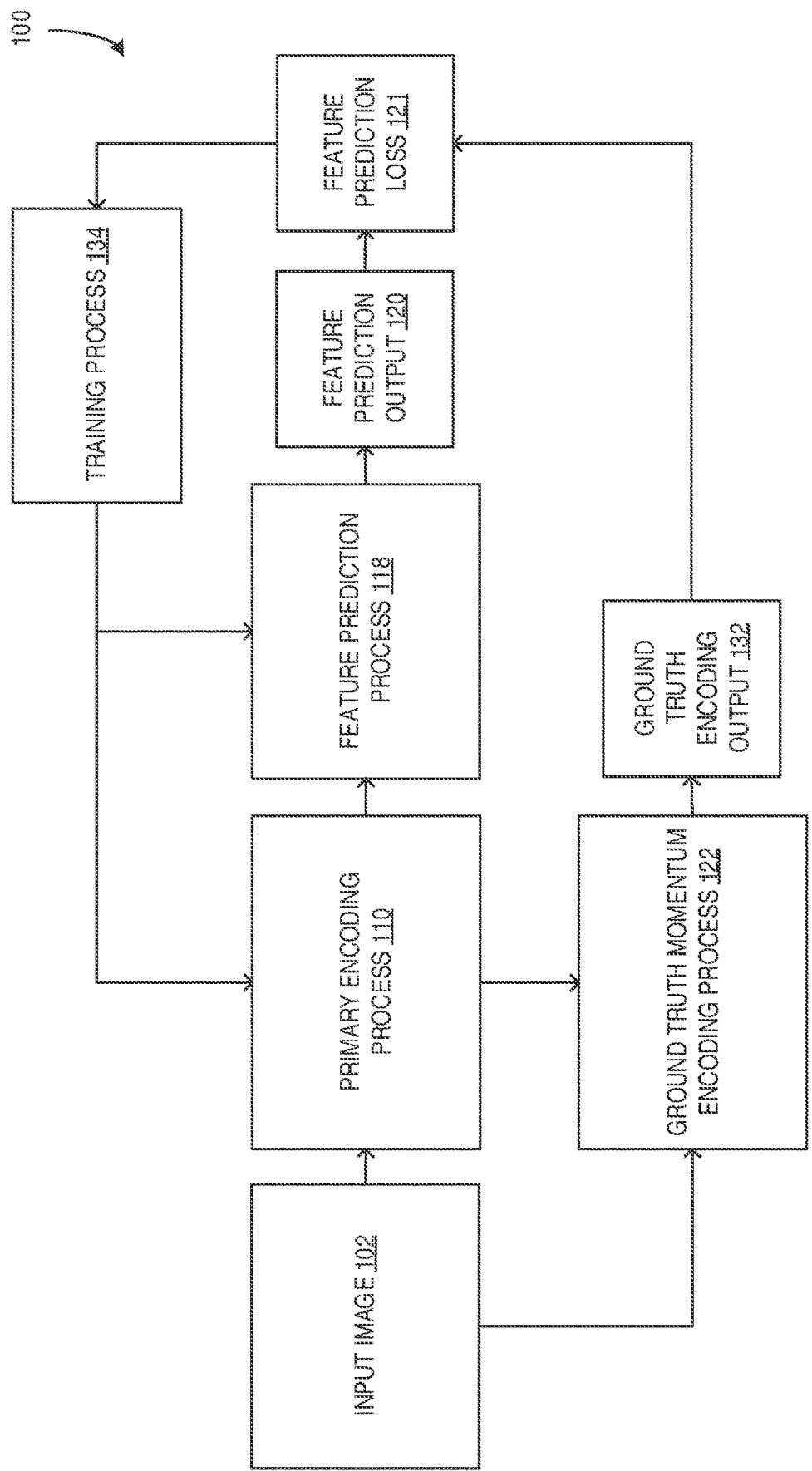
FIG. 1 is a block diagram illustrating a process for training an encoder network to inpaint images that are partially masked using a ground truth momentum encoding process that is dynamically updated as the primary encoding process is trained.

Aspects of the disclosure provide a computerized method and system for training an encoder network to inpaint images with masked portions. In some examples, inpainting images includes predicting and/or estimating image data that fits into a portion of an image that is masked or otherwise disrupted based on analysis of image data of other portions of the image that are not masked. The disclosure processes input images as training data in non-overlapping patches, where patches that include some portion of a masked region are masked patches and patches that include only unmasked regions are visible patches. An input image is first divided into patches and then some of the patches are masked, while others are left visible. The visible patches are then provided to an encoding process, which encodes the image data of the visible patches into encoded token data that is representative of structural features. The encoded token data is then decoded using two decoding process branches, including a pixel regression process and a feature prediction process. The pixel regression process generates output including pixel-level image data of masked patches based on the encoded token data and the feature prediction process generates output including image feature data of masked patches. Losses associated with the outputs of the decoding processes are determined and those losses are used to train the encoding process to improve its accuracy at generating encoded token data. In some examples, determining the loss of the feature prediction process includes using momentum encoded token data as ground truth target data, wherein the momentum encoded token data is generated by a momentum encoding process that is configured to be updated dynamically as the encoding process is adjusted during training. Additionally, or alternatively, the decoding processes are provided with feature data that is independent of the output of the encoding process and the decoding processes use the provided feature data as context data throughout the decoding processes.

The disclosure operates in an unconventional manner at least by using the two decoding process branches to predict or otherwise identify different aspects and/or features of the mased portions or patches of input image data, wherein the pixel regression process is configured and tuned to specifically predict and/or identify pixel-level features (e.g., inpainted image pixel data) while the feature prediction process is configured and tuned to specifically predict and/or identify larger features of the image that span multiple pixels (e.g., inpainted image feature data). Each decoding process can be trained and tuned to perform its specific task without being influenced to perform the task of the other decoding process, resulting in decoders with improved accuracy. Further, in some examples, the disclosure operates in an unconventional manner at least by providing the feature prediction process with dynamic prediction targets through the use of the momentum encoding process (e.g., the momentum encoding process is updated based on an exponential moving average (EMA) of parameters of the trained encoding process). These dynamic prediction targets provide dynamically deeper semantics than static prediction targets of other implementations. Additionally, or alternatively, the disclosure operates in an unconventional manner by using feature injection processes with the decoding processes to form target-aware decoders that reduce training pressure on the encoding process to learn target-specific information, rather than learning to represent the structural features of the input image in the encoded token data. For instance, in an example, low-level feature data is obtained from the encoding process and provided to the pixel regression process and high-level feature data is obtained from the encoding process and provided to the feature prediction process in a way that is independent of the output of the encoding process. By passing the feature data to the decoding processes independently of the output of the encoding process, the disclosure explicitly and continuously provides target-specific context information to the decoding processes that does not influence the encoding process to learn such target-specific details.

In some examples, the disclosure includes a Masked Autoencoder (MAE) that is bootstrapped through the use of the momentum encoder as described herein. This bootstrapped MAE (BootMAE) is configured with the momentum encoder that provides online features as extra Bidirectional Encoder Representations from Transformers (BERT) prediction targets and with target-aware decoders that reduce the pressure on the encoder to memorize target-specific information in BERT pretraining. Using a pretrained MAE to extract features as the BERT prediction target for masked token achieves good pretraining performance, but the use of a momentum encoder in parallel with the original MAE encoder improves on the training performance by using its own dynamic representation as the training target. Additionally, or alternatively, target-specific information, such as pixel values of visible patches, are introduced directly to the decoder to reduce the pressure on the encoder to learn the target-specific information. Thus, the encoder is configured to focus on semantic modeling, which is the goal of BERT pretraining. Wasted capacity of the resulting model spent on learning the target-specific information is avoided by using the described feature injection processes.

Additionally, in some examples, the disclosure operates only on visible patches and the output representation from the encoder along with masked tokens are provided to lightweight decoders. Shifting the mask tokens into the decoder rather than processing them with the encoder first results in a reduction of required competition and increases efficiency of the encoding process.

Further, in some examples, the disclosure uses both pixel-level decoding and higher-level feature-based decoding, which increases the accuracy of the resulting encoder network at classification tasks or the like. Use of the feature prediction process branch and the momentum encoding process to generate dynamic prediction targets enables this increase in accuracy, while using the pixel regression branch in parallel provides accurate pixel-wise prediction and regularization in differentiating images.

FIG. 1 is a block diagram illustrating a process 100 for training an encoder network (e.g., the primary encoding process 110 and the feature prediction process 118) to inpaint images that are partially masked using a ground truth momentum encoding process 122 that is dynamically updated as the primary encoding process 110 is trained. In some examples, the process 100 is executed or otherwise performed by a system such as system 300 of FIG. 3 as described below. Alternatively, in other examples, other systems and/or arrangements of components are used to perform the process 100 without departing from the description.

The process 100 includes providing an input image 102 (e.g., a masked input image as described herein) to a primary encoding process 110. In some examples, providing the input image 102 to the primary encoding process 110 includes applying a mask or masks to the input image 102, such that some portion (e.g., a masked portion) of the input image 102 is blank or otherwise includes image data that is disrupted or not usable. Additionally, or alternatively, in some examples, the primary encoding process 110 is provided only the image data of the unmasked portion, or visible portion, of the input image 102, such that applying a mask to the input image 102 is performed by assigning some portions of the input image 102 a masked status and other portions of the input image 102 a visible status.

Further, in some examples, the input image 102 is divided into patches (e.g., non-overlapping portions of the input image 102 that are usually consistently shaped and/or sized) and the mask is applied to those patches, such that some patches are masked, and other patches are visible. This process is described in greater detail below with respect to system 300 of FIG. 3.

The primary encoding process 110 encodes the image data of the input image 102 that is received as input, and the resulting encoded image data or encoded token data (e.g., in the form of feature vectors and/or tokens), is provided to the feature prediction process 118. The feature prediction process 118 decodes the encoded image data in such a way that predicted features of the masked portion of the input image 102 are generated based on the structure and/or other features that are present in the image data of the visible portion of the input image 102 and that are reflected in the encoded image data generated by the primary encoding process 110.

The feature prediction output 120 of the feature prediction process 118 includes the predicted features (e.g., inpainted image feature data) of the masked portion of the input image 102. Further, in some examples, the feature prediction output 120 includes predicted features of the visible portion of the input image 102 that are generated based on the encoded image data from the primary encoding process 110. However, in most examples, the primary encoding process 110 and the feature prediction process 118 are being trained to generate the predicted features of the masked portions of input images specifically, so any predicted features of visible portions of input images are not used further during the described training process.

The feature prediction output 120 is used to determine a feature prediction loss 121, which is further used during the training process 134 to tune and/or adjust the primary encoding process 110 and feature prediction process 118. The feature prediction loss 121 further depends on the ground truth encoding output 132 from the ground truth momentum encoding process 122. In some examples, the ground truth momentum encoding process 122 runs in parallel with the primary encoding process 110.

In some examples, the entire input image 102 is provided to the ground truth momentum encoding process 122, such that all image data from the input image 102 is encoded by the process 122 and none of the input image 102 is treated as being masked. Thus, the encoding process 122 generates encoded image data for the entire input image as ground truth encoding output 132 (e.g., in the form of feature vectors) and that encoded image data is used as a prediction target in determining the feature prediction loss 121. For instance, the feature prediction output 120 associated with a masked portion of the input image 102 is compared to the ground truth encoding output 132 for the same portion of the input image 102 and the difference between the two is used to determine the feature prediction loss 121, where a larger difference indicates a larger loss 121.

Further, in some such examples, the ground truth momentum encoding process 122 is updated based on changes made to the primary encoding process 110 during the training process 134. For instance, the momentum encoding process 122 is configured by parameterizing the weights of the primary encoding process 110 using an exponential moving average (EMA). Additionally, or alternatively, in other examples, other methods are used to update the ground truth momentum encoding process 122 based on changes to the primary encoding process 110 without departing from the description. As the training proceeds, the momentum encoding process 122 provides dynamically deeper semantics than fixed targets via this bootstrapping of the momentum encoding process 122.

In some examples, the feature prediction loss 121 is used during the training process 134 to adjust and/or tune parameters of the primary encoding process 110 and/or the feature prediction process 118 as described herein. It should be understood that, in some examples, the training process 134 is performed using one or more machine learning techniques without departing from the description.

Further, in some examples, the trained primary encoding process 110 is then used to generate inpainted output images from masked input images. For instance, in some such examples, the trained primary encoding process 110 and at least one decoding process, such as the feature prediction process 118 as described herein, are used to encode data of a masked input image into encoded token data and then to decode the encoded token data into inpainted image data, such as inpainted image feature data. The inpainted image data is combined with visible portions of the masked input image to generate an inpainted output image.

Figure 2:
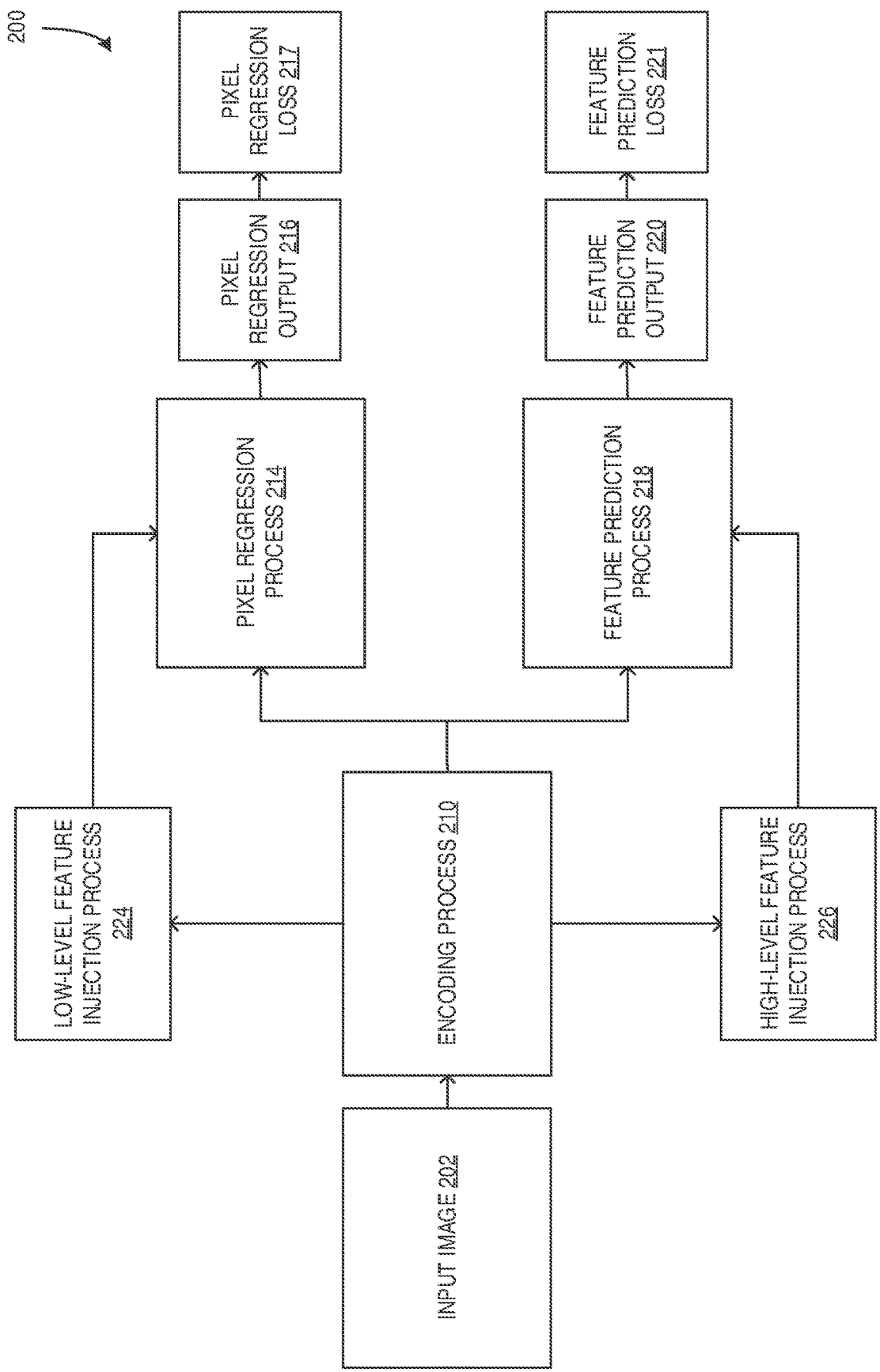
FIG. 2 is a block diagram illustrating a process for training an encoder network to inpaint images that are partially masked using feature injection processes to enhance the decoding processes, including a pixel regression process and a feature prediction process.

FIG. 2 is a block diagram illustrating a process 200 for training an encoder network to inpaint images that are partially masked using feature injection processes to enhance the decoding processes, including a pixel regression process and a feature prediction process. In some examples, the process 200 is executed or otherwise performed by a system such as system 300 of FIG. 3 as described below. Alternatively, in other examples, other systems and/or arrangements of components are used to perform the process 200 without departing from the description.

The process 200 includes providing an input image 202 to an encoding process 210. In some examples, providing the input image 202 to the encoding process 210 includes applying a mask or masks to the input image 202, such that some portion (e.g., a masked portion) of the input image 202 is blank or otherwise includes image data that is disrupted or not usable. Additionally, or alternatively, in some examples, the encoding process 210 is provided only the image data of the unmasked portion, or visible portion, of the input image 202, such that applying a mask to the input image 202 is performed by assigning some portions of the input image 202 a masked status and other portions of the input image 202 a visible status.

Further, in some examples, the input image 202 is divided into patches (e.g., non-overlapping portions of the input image 202 that are usually consistently shaped and/or sized) and the mask is applied to those patches, such that some patches are masked, and other patches are visible. This process is described in greater detail below with respect to system 300 of FIG. 3.

The encoding process 210 encodes the image data of the input image 202 that is received as input, and the resulting encoded image data or encoded token data (e.g., in the form of feature vectors and/or tokens), is provided to the pixel regression process 214 and the feature prediction process 218. In some examples, the pixel regression process 214 decodes the encoded image data in such a way that predicted pixel values and/or other pixel-level features (e.g., inpainted image pixel data) of the masked portion of the input image 202 are generated based on the pixel values and/or pixel-level features that are present in the image data of the visible portion of the input image 202 and that are reflected in the encoded image data generated by the encoding process 210. Further, in some examples, the feature prediction process 218 decodes the encoded image data in such a way that predicted features (e.g., inpainted image feature data) of the masked portion of the input image 202 are generated based on the structure and/or other features that are present in the image data of the visible portion of the input image 202 and that are reflected in the encoded image data generated by the encoding process 210.

Additionally, in some examples, the pixel regression process 214 is provided low-level feature data (e.g., pixel values of visible portions of the input image 202) via a low-level feature injection process 224 and the feature prediction process 218 is provided high-level feature data (e.g., multi-pixel structural features of the input image 202) via a high-level feature injection process 224. The pixel regression process 214 and feature prediction process 218 incorporate the injected feature data as context data used when generating the pixel regression output 216 and feature prediction output 220, respectively. The use of these feature injection processes 224 and 226 reduce the pressure on the encoding process 210 to "memorize" or otherwise learn target-specific information about the input image 202 during training and encourage the encoding process 210 to focus on semantic modeling that benefits from pre-training. The feature injection processes 224 and 226 continuously provide target-specific context information to the processes 214 and 218 respectively, effectively decoupling that context information from the encoding process 210 so that the training of the encoding process 210 is directed toward structure learning.

Additionally, or alternatively, the low-level feature injection process 224 provides the low-level feature data from an early stage, or shallow layer, of the encoding process 210 (e.g., prior to processing by transformer blocks of the encoding process 210) such that the whole pixel-level data is provided as context information to the pixel regression process 214. Alternatively, in some examples, the high-level feature injection process 226 provides the high-level feature data from a later stage, or deep layer, of the encoding process 210 (e.g., a layer after processing by at least some transformer blocks).

In some examples, the pixel regression output 216 of the pixel regression process 214 includes the predicted pixel values and/or associated features of the masked portion of the input image 202. Further, in some examples, the pixel regression output 216 includes predicted pixel values and/or associated features of the visible portion of the input image 202 that are generated based on the encoded image data from the encoding process 210. However, in most examples, the encoding process 210 and the pixel regression process 214 are being trained to generate the predicted pixel values and/or associated features of the masked portions of input images specifically, so any predicted features of visible portions of input images are not used further during the described training process.

Further, in some examples, the pixel regression output 216 is used to determine a pixel regression loss 217, which is further used to tune and/or adjust the encoding process 210 and pixel regression process 214. It should be understood that, in some such examples, the pixel regression loss 217 is used to train the encoding process 210 and pixel regression process 214 using machine learning techniques as described herein with respect to at least process 100 of FIG. 1 and/or system 300 of FIG. 3.

In some examples, the feature prediction output 220 of the feature prediction process 218 includes the predicted features of the masked portion of the input image 202. Further, in some examples, the feature prediction output 220 includes predicted features of the visible portion of the input image 202 that are generated based on the encoded image data from the encoding process 210. However, in most examples, the encoding process 210 and the feature prediction process 218 are being trained to generate the predicted features of the masked portions of input images specifically, so any predicted features of visible portions of input images are not used further during the described training process.

Further, in some examples, the feature prediction output 220 is used to determine a feature prediction loss 221, which is further used to tune and/or adjust the encoding process 210 and feature prediction process 218. It should be understood that, in some such examples, the feature prediction loss 221 is used to train the encoding process 210 and feature prediction process 218 using machine learning techniques as described herein with respect to at least process 100 of FIG. 1 and/or system 300 of FIG. 3.

Further, in some examples, the trained encoding process 210 is then used to generate inpainted output images from masked input images. For instance, in some such examples, the trained encoding process 210 and at least one decoding process, such as a pixel regression process 214 and/or a feature prediction process 218 as described herein, are used to encode data of a masked input image into encoded token data and then to decode the encoded token data into inpainted image data, such as inpainted image pixel data and/or inpainted image feature data. The inpainted image data is combined with visible portions of the masked input image to generate an inpainted output image.

Figure 3:
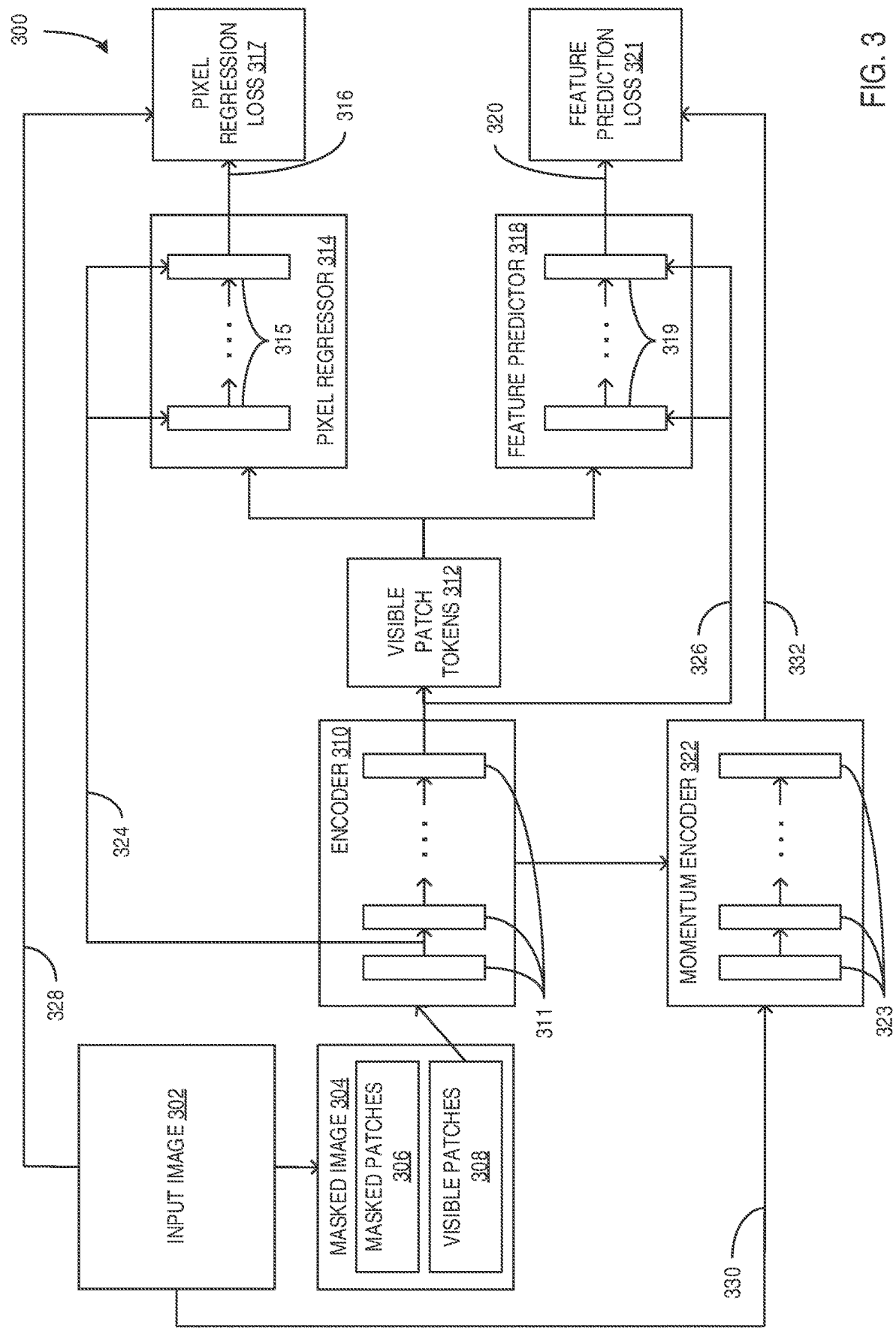
FIG. 3 is a block diagram illustrating a system configured to train an encoder network to inpaint masked portions of input images using a momentum encoder and feature injection into decoder portions of the network.

FIG. 3 is a block diagram illustrating a system 300 configured to train an encoder network (e.g., an encoder 310, a pixel regressor 314, and a feature predictor 318) to inpaint masked portions of input images (e.g., predict and/or estimate the image structure that is masked and fill it in) using a momentum encoder 322 and feature injection (e.g., at 324 and 326) into decoder portions (the pixel regressor 314 and the feature predictor 318) of the network. In some examples, the input image 302 is divided into patches, such as by dividing the image into a set of non-overlapping squares or other shapes based on the dimensions of the input image 302 (e.g., an input image is divided into 64 patches by dividing each of the height and width of the image into eight equally sized sections). Some of the resulting patches are then masked, transforming them into masked patches 306 of the masked image 304, while other patches are left as visible patches 308. The image data of the masked patches 306 in the masked image 304 is transformed to be empty or at least considered to be empty for the purposes of the system 300. The masked patches 306 represent the portions of the input image 302 that the encoder network is trained to inpaint and/or otherwise predict or estimate.

Figure 6:
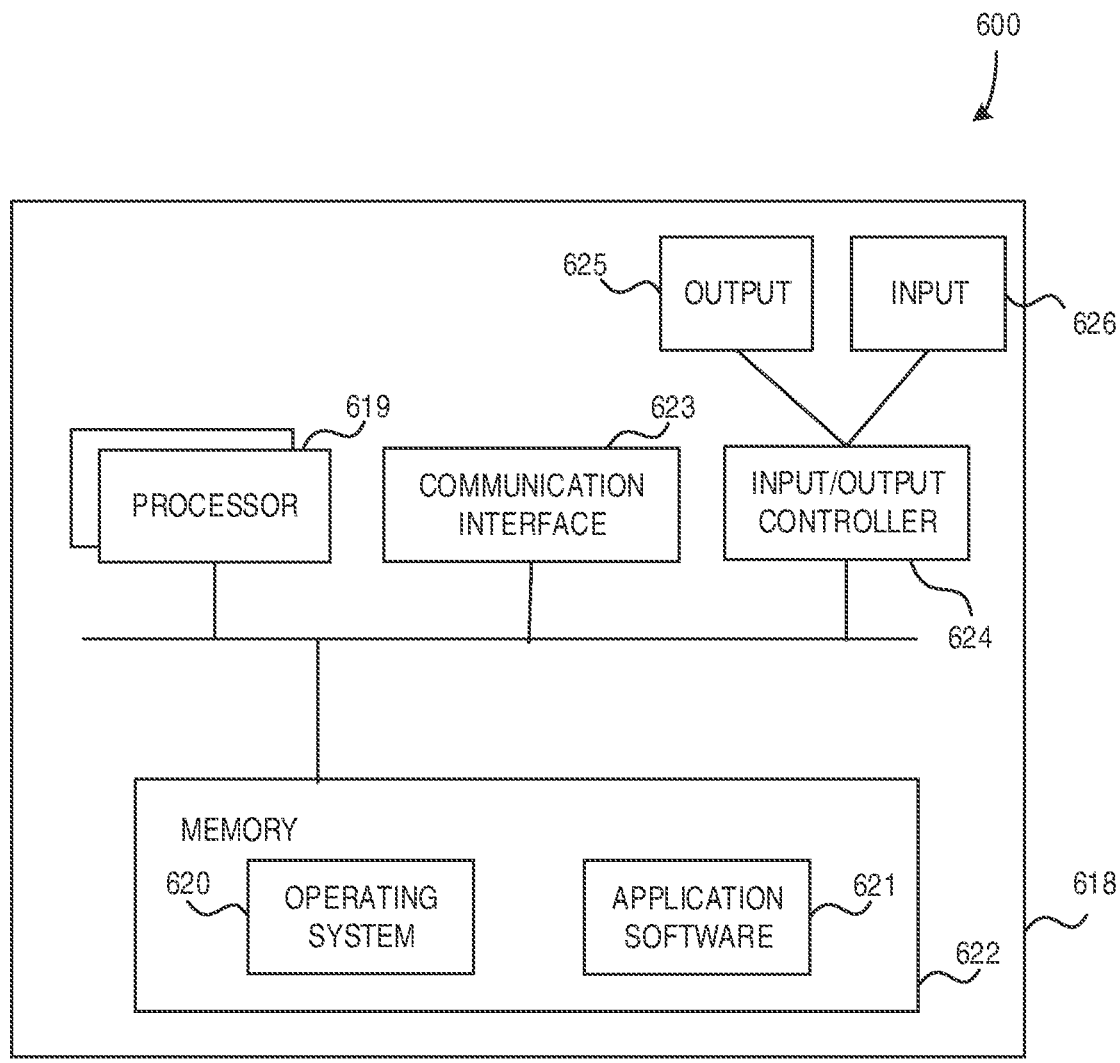
FIG. 6 illustrates an example computing apparatus as a functional block diagram.

In some examples, the system 300 includes one or more computing devices (e.g., the computing apparatus of FIG. 6). In examples where the system 300 includes multiple computing devices, the computing devices are configured to communicate with each other using one or more communication networks (e.g., a private intranet, the Internet, or the like). It should be understood that, in such examples, the components of the system 300 are distributed among the multiple computing devices in any arrangement without departing from the description.

In some examples, portions of the system 300 may be represented as follows. An input image 302 is $X \in \mathbb{R}^{H \times W \times C}$, where H and W denote the image height and image width (e.g., in pixels or other units), respectively, and C denotes the quantity of color channels in the image (e.g., a color image includes three channels for red, green, and blue). The input image 302 is split into non-overlapping patches, resulting in $N = H \times W / P^2$ patches where P denotes the resolution of each patch (e.g., the length of one side of a square patch in pixels or other units). Thus, the input image 302 is represented by a number of patches $X = \{x^1, x^2, \ldots, x^N\}$ and a vector reshaped from one of the image patches is denoted by $x^n \in \mathbb{R}^{P^2 C}$. Thereafter, a fraction $N_m$ of the patches are randomly or pseudo-randomly sampled to be masked (e.g., masked patches 306) and the remaining $N_v$ patches are left to be visible (e.g., visible patches 308), wherein the set of patches is represented by $N = N_m + N_v$. The fraction of patches that are masked is defined prior to the initiation of the process and may be defined based on observed effectiveness of the training process during prior iterations. In some such examples, the fraction of patches that are masked is relatively large (e.g., 75% of patches masked and 25% left visible). If $\mathcal{M}$ is the index set of masked patches 306, visible patches 308 are denoted by $X_v = \{x^k | k \notin \mathcal{M}\}$ and masked patches 306 are denoted by $X_m = \{x^k | k \in \mathcal{M}\}$. Further, the masked image 304 is denoted by $X = X_v \cup X_m$ and $X_v \cap X_m = \emptyset$. In some such examples, each patch is associated with a positional embedding or other indicator that indicates the location of each patch. Such positional embeddings include the set of positional embeddings for visible patches 308 denoted $P_v$ and the set of positional embeddings for masked patches denoted $P_m$.

To begin an iteration of the training of the encoder network of the system 300, the visible patches 308 are provided to the encoder 310. Further, in some examples, data associated with the locations of the visible patches 308 and the locations of the masked patches 306 within the masked image 304 are included (e.g., the encoder 310 has information indicating which patches are adjacent to each other and on which sides, or the like). The encoder 310 encodes the data of the visible patches 308 into visible patch tokens 312 using a series of image encoder blocks 311.

In some examples, the encoder 310 includes hardware, firmware, and/or software configured to execute or otherwise perform an encoding process, such as encoding processes 110 and/or 210. The encoder 310 is configured to focus on learning structural knowledge about the input image 302. Further, the encoder 310 is configured to output a latent representation that models the image structure in the form of feature vectors, which are then converted into visible path tokens 312. For instance, in some such examples, each visible patch (e.g., the image data of the visible patch) is initially projected into an image embedding or vector and a positional embedding is added to the image embedding to ensure awareness of position for each patch, forming a combined embedding. After this, the combined embedding is processed by a series of encoding blocks 311 of the encoder 310 (e.g., a stack of standard vision Transformer blocks based on self-attention). Formally, in an example, the encoding process performed by the encoder 310 is represented by $Z_v$=Enc($X_v$,$P_v$), where $Z_v$ is the latent representation of the image structure in the form of feature vectors and Enc(.,.) is the encoding function. Additionally, in some examples, the output of the encoder 310 is normalized (e.g., $\hat{Z}_v$=norm($Z_v$) where $\hat{Z}_v$ is the set of normalized feature vectors and norm(.) is a normalization function) to a form that captures the image structure (e.g., the visible patch tokens 312).

In examples where only the visible patches 308 are provided to the encoder 310, the computation and memory usage is very efficient, even for large scale models, as only a small subset (e.g., 25%) of the image patches are processed by the encoder 310. Moreover, the elimination of the masked patches enables the described training process of the encoder 310 to both pre-train the encoder 310 and fine-tune the encoder 310, as fine-tuning in other similar training processes enables the encoder 310 to see visible patches without any masks.

While the described training processes primarily describe the use of block-wise masking (e.g., entire patches are masked randomly), in other examples, other types of masking strategies are used. Different masking strategies are favored by different prediction targets, so choosing the masking strategy to use can be determined based on the prediction targets of the models being trained.

The visible patch tokens 312 are provided to each of the pixel regressor 314 and the feature predictor 318. The pixel regressor 314 uses the data of the visible patch tokens 312 to predict the pixels that are present in the masked patches 306 of the masked image 304. The pixel regressor 314 performs the regression process using a series of pixel regressor blocks 315. Each of the pixel regressor blocks 315 is provided an injection of 'low-level feature data' (e.g., pixel data from the visible patches 308 prior to being encoded by the encoder 310) as illustrated by 324. The feature injection 324 reduces the pressure on the encoder 310 to 'memorize' target-specific information during the training process.

The feature injection processes represented by 324 and 326 provide context information into the pixel regressor 314 and the feature predictor 318 respectively, where the context information is provided to each block 315 of the pixel regressor 314 and each block 319 of the feature predictor 318. The context information is low-level feature context information to each block 315 and high-level feature context information to each block 319, respectively. The decoder portion of the encoder network, the pixel regressor 314 and feature predictor 318, makes predictions based on the structure knowledge provided by the visible patch tokens 312 and the context information of the visible patches, which is provided by the feature injection processes 324 and 326. By feeding this context information into each block of the pixel regressor 314 and the feature predictor 318, the encoder 310 is better trained to capture structural features of the visible patches 308 without also learning context information that is specific to the training images being used.

In some examples, the pixel regressor 314 includes hardware, firmware, and/or software configured to execute or otherwise perform a decoding process, such as pixel regression process 214. The pixel-level prediction processes performed by the pixel regressor 314 focus on low-level details (e.g., pixel-specific data). These processes are enabled and/or improved by providing low-level context information in the form of pixel data values to each block 315 of the pixel regressor 314 at 324. Alternatively, the feature-level prediction processes performed by the feature predictor 318 focus on high-level details (e.g., multi-pixel semantic feature representation). These processes are enabled and/or improved by providing high-level context information in the form of encoded feature data to each block 319 of feature predictor 318 at 326. Therefore, the pixel-based context information is provided to the pixel regressor 314 from a shallow layer of the encoder 310 (e.g., a layer prior to processing by transformer blocks) and the high-level context information is provided to the feature predictor 318 from a deep layer of the encoder 310 (e.g., a layer after processing by at least some transformer blocks). In some examples, $Z_v^{deep}$ is used to represent the deep or high-level features of the encoder 310 that are provided to the feature predictor 318 at 326 and $Z_v^{shallow}$ is used to represent the shallow or low-level features of the encoder 310 that are provided to pixel regressor 314 at 324.

Further, in some examples, the context information provided to the pixel regressor 314 and feature predictor 318 are incorporated into the blocks of those components using a cross-attention operator. In such examples, the features provided from the encoder 310 are used as keys and values and the features from the regressor 314 or predictor 318 are used as queries to perform cross-attention. Use of the cross-attention operator leverages the low-level information for better pixel reconstruction and the high-level information for better feature prediction. In some such examples, the cross-attention operator is applied after the self-attention operation in each transformer block of the regressor 314 and predictor 318.

In some examples, the pixel regressor 314 is configured to focus on predicting the missing pixels of the masked patches 306 given the structural knowledge provided by the encoder 310 and the context information from the visible patches (e.g., the low-level feature data and/or pixel values at 324) as described herein. The pixel-level regression/prediction helps to prevent the model from collapsing and guides the model to learn reasoning about low-level textures of images. The input of the pixel regressor 314 includes the normalized latent representation output of the encoder 310 in the form of the visible patch tokens 312 and the shallow or low-level features provided by the feature injection process 324.

In some examples, the operations of the pixel regressor 314 include adding mask tokens containing learnable vectors that are associated with the positions of the masked patches 306 in the masked image 304. To ensure that the mask tokens are associated with the correct positions, positional embeddings are added to each of the mask tokens. In some such examples, the regression process performed on the visible patch tokens 312 and the mask tokens includes two vision transformer blocks and a fully connected layer to predict missing pixels in the mask tokens. However, in other examples, other types of blocks and/or arrangements thereof are used to predict missing pixels in the mask tokens without departing from the description.

Additionally, in some examples, the regression process may be represented as $\overline{X}$=Reg($\hat{Z}_v$,$Z_v^{shallow}$,$R_m$,$P_m$), where $\overline{X}$ is the output of the regression process, $\hat{Z}_v$ is the normalized output of the encoder 310 (e.g., the visible patch tokens 312), $Z_v^{shallow}$ is the low-level or shallow context information provided by the feature injection process 324, $R_m$ are the mask tokens. $P_m$ is the positional data associated with the locations of the masked patches 306, and Reg(.,.,.,.) is the regression function.

In some examples, the pixel regression output 316 is compared with pixel data 328 (e.g., pixel data of the pixels in the masked patches 306) from the input image 302 to determine a pixel regression loss 317. The pixel regression loss 317 is used to tune or otherwise adjust the encoder 310 and the pixel regressor 314 to improve the performance of both in predicting the pixels in masked portions of future input images.

In some such examples, the pixel regression output 316 includes predicted image pixel data in the positions of the masked patches 306 and the positions of the visible patches 308 (e.g., inpainted image pixel data as described herein). However, only the predicted image pixel data associated with the masked patches 306 is used in the pixel regression loss 317 determination. Each element of the output 316 is a vector of pixel values representing a patch, such that there is an element of the output 316 for each patch of the masked image 304. Additionally, in some examples, the objective function for calculating the loss 317 of the pixel regressor 314 is represented by $$\mathcal{L}_R = \sum_{k \in M} \frac{1}{p2_C} \|g_m^k - \bar{x}_m^k\|_2^2,$$

where $g_m^k$ is the normalized representation of a patch $x_m^k$ using the mean and standard deviation computed from all pixels in that patch, and $\overline{X}_m^k$ is the representation of the reconstructed masked patch in $\overline{X}$.

In some examples, the feature predictor 318 includes hardware, firmware, and/or software configured to execute or otherwise perform a decoding process, such as feature prediction processes 118 and/or 218. The feature predictor 318 uses the data of the visible patch tokens 312 to predict the high-level features, shapes, or the like of the masked patches 306 of the masked image 304. The feature predictor 318 performs the prediction process using a series of feature predictor blocks 319. Each of the feature predictor blocks 319 is provided an injection of 'high-level feature data' (e.g., structural features, context data from the visible patches 308, or the like) as illustrated by 326. The feature injection 326 reduces the pressure on the encoder 310 to 'memorize' target-specific information during the training process.

In some examples, the feature predictor 318 is configured to make feature predictions for the masked patches 306 based on the structural knowledge from the encoder 310 and the context information of the visible patches 308 (e.g., the high-level feature data at 326) as described herein. The high-level feature prediction target guides the encoder network or model to learn reasoning about high-level semantics. The input of the feature predictor 318 includes the normalized latent representation from the encoder 310 in the form of the visible patch tokens 312 and the deep features providing context information from the feature injection process 326. A set of mask tokens is added that represent the masked patches 306 of the masked image 304 and they are associated with positional embeddings, as described above with respect to the pixel regressor 314. In some such examples, the feature prediction processes consist of two transformer blocks with a Multi-Layer Perceptron (MLP) layer for prediction. In other examples, other types of blocks and/or arrangements thereof are used without departing from the description.

The feature prediction processes are trained and configured to predict high-level features in the mask tokens based on the data of the visible patch tokens 312 and the context information from feature injection 326. In such examples, the resulting feature prediction output 320 includes predicted feature image data in the positions of the masked patches 306 and image data of the input image in the positions of the visible patches 308.

Additionally, in some examples, the feature prediction process is represented as $\overline{F}=\text{Pre}(\hat{Z}_v,Z_v^{deep},S_m,P_m)$, where $\overline{F}$ is the output of the feature prediction process, $\hat{Z}_v$ is the normalized output of the encoder 310 (e.g., the visible patch tokens 312), $Z_v^{deep}$ is the high-level or deep context information provided by the feature injection process 326, $S_m$ are the mask tokens, $P_m$ is the positional data associated with the locations of the masked patches 306, and Pre(.,.,.,.) is the feature prediction function.

In some examples, the feature prediction output 320 is compared with encoded feature data 332 from the momentum encoder 322 to determine a feature prediction loss 321. The feature prediction loss 321 is used to tune or otherwise adjust the encoder 310 and the feature predictor 318 to improve the performance of both in predicting high-level features in masked portions of future input images.

In some such examples, the feature prediction output 320 includes predicted feature image data in the positions of the masked patches 306 and the positions of the visible patches 308 (e.g., inpainted image feature data as described herein). However, only the predicted feature image data associated with the masked patches 306 is used in the feature prediction loss 321 determination. The feature prediction output 320 is compared to prediction feature ground truth data that is the latent representation of the input image 302 obtained by passing the input image 302 data through the momentum encoder 322 to obtain the encoded feature data 332. In some such examples, the momentum encoder 322 is configured by parameterizing the weights of the encoder 310 using an EMA. Additionally, in some examples, the objective function for calculating the loss 321 of the feature predictor 318 may be represented by $$\mathcal{L}_p = \sum_{k \in M} \frac{1}{\#\text{dim}} \|f_m^k - \overline{f}_m^k\|_2^2,$$

where #dim is the feature dimension of the tokens, $f_m^k$ is a token in the set of ground truth tokens of encoded feature data 332, and $\overline{f}_m^k$ is a token in the set of tokens in the feature prediction output 320. In some such examples, the overall loss of the encoder network may be represented by $\mathcal{L} = \mathcal{L}_R + \lambda \mathcal{L}_p$, where $\mathcal{L}_R$ is the pixel regression loss 317, $\mathcal{L}_p$ is the feature prediction loss 321, and $\lambda$ is a hyperparameter tuning value of the loss weight (e.g., it is set to 1 by default but may be set to other values).

The momentum encoder 322 is used to encode image data at 330 from the input image 302 to enable the use of the encoded feature data 332 in determining the feature prediction loss 321. The momentum encoder 322 is updated based on the encoder 310, such that adjustments made to the encoder 310 are reflected in the momentum encoder 322, providing dynamic, accurate targets for training the feature predictor 318 and the encoder 310, thereby providing richer and deeper semantics than other implementations that use fixed targets. In some examples, the momentum encoder 322 is a temporal ensemble of the encoder 310, wherein the weights are parameterized by an exponential moving average (EMA) of the encoder 310 parameters. For each iteration, the full input image 302 is passed to the momentum encoder 322 via 330 and processed by layers or blocks 323 of the momentum encoder 322 to provide ground-truth representation for masked patches 306 when evaluating the output 320 of the feature predictor 318 and calculating the loss 321 as described herein.

After the encoder network of system 300 is considered to be sufficiently trained (e.g., the determined losses 317 and 321 are sufficiently small), the encoder network is then used for downstream tasks, such as inpainting portions of input images that include masked or flawed regions, classification, object detection and segmentation, and the like.

For instance, in some examples, the trained encoder 310 is then used to generate inpainted output images from masked input images. For instance, in some such examples, the trained encoder 310 and at least one decoder, such as a pixel regressor 314 and/or a feature predictor 318 as described herein, are used to encode data of a masked input image into encoded token data and then to decode the encoded token data into inpainted image data, such as inpainted image pixel data and/or inpainted image feature data. The inpainted image data is combined with visible portions of the masked input image to generate an inpainted output image.

Figure 4:
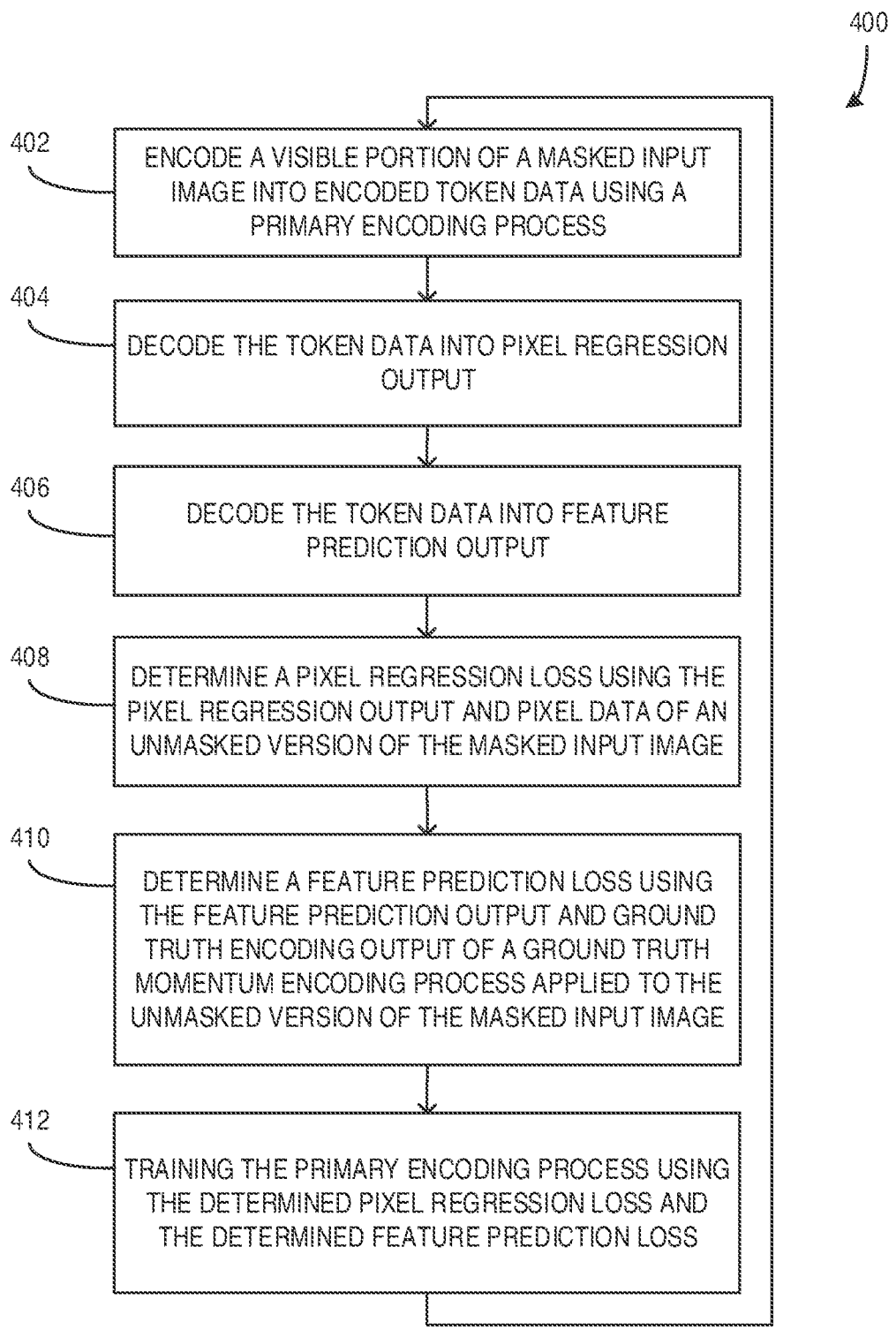
FIG. 4 is a flowchart illustrating a method for training a primary encoding process to inpaint images that are partially masked using pixel regression and feature prediction.

FIG. 4 is a flowchart illustrating a method 400 for training a primary encoding process to inpaint images that are partially masked using pixel regression and feature prediction. In some examples, the method 400 is executed or otherwise performed by a process such as processes 100 and/or 200 of FIGS. 1 and/or 2, respectively, and/or in systems such as system 300 of FIG. 3.

At 402, a visible portion of the masked input image is encoded into encoded token data using a primary encoding process. In some examples, the encoding is performed by an encoding process such as encoding processes 110 and/or 210, and/or encoder component such as encoder 310.

Further, in some examples, the method 400 includes receiving an unmasked version of the masked input image, dividing the received unmasked version of the masked input image into a set of non-overlapping patches, applying a mask to a first subset of the set of non-overlapping patches, wherein the first subset of patches is a set of masked patches and a second subset of the set of non-overlapping patches is a set of visible patches, wherein the visible portion of the masked input image includes the set of visible patches, and wherein the encoded token data includes an encoded token for each visible patch of the set of visible patches.

At 404, the token data is decoded into pixel regression output (e.g., pixel regression output 216 and/or 316), wherein the pixel regression output includes inpainted image pixel data associated with the masked portion of the masked input image. In some examples, this decoding of the token data is performed by a pixel regression process such as process 214 and/or by a pixel regressor component such as pixel regressor 314.

At 406, the token data is decoded into feature prediction output (e.g., feature prediction output 120, 220, and/or 320), wherein the feature prediction output includes inpainted image feature data associated with masked portions of the masked input image. In some examples, this decoding of the token data is performed by a feature prediction process such as processes 118 and/or 218, and/or by a feature predictor component such as feature predictor 318.

At 408, a pixel regression loss (e.g., pixel regression loss 217 and/or 317) is determined using the pixel regression output and pixel data of an unmasked version of the masked input image.

At 410, a feature prediction loss (e.g., feature prediction loss 121, 221, and/or 321) is determined using the feature prediction output and ground truth encoding output (e.g., ground truth encoding output 132 and/or 332) of a ground truth momentum encoding process (e.g., ground truth momentum encoding process 122 and/or momentum encoder 322) applied to the unmasked version of the masked input image (e.g., the input images 102 and/or 302).

At 412, the primary encoding process is trained using the determined pixel regression loss and the determined feature prediction loss. In some examples, the primary encoding process is trained using machine learning techniques. Further, in some such examples, the training of the encoding process includes changing parameters of the process to improve the capability of the encoding process to generate encoded token data that reflects features of input images.

Further, in some examples, the trained primary encoding process is then used to generate inpainted output images from masked input images. For instance, in some such examples, the trained primary encoding process and at least one decoding process, such as a pixel regression process and/or a feature prediction process as described herein, are used to encode data of a masked input image into encoded token data and then to decode the encoded token data into inpainted image data, such as inpainted image pixel data and/or inpainted image feature data. The inpainted image data is combined with visible portions of the masked input image to generate an inpainted output image.

Additionally. or alternatively, the method 400 includes updating parameters of the ground truth momentum encoding process based on changes made to the primary encoding process during training thereof. In some such examples, updating the parameters of the ground truth momentum encoding process includes updating the parameters based on an EMA of parameters of the primary encoding process.

In some examples, the training of the primary encoding process includes pretraining the encoding process and/or model using sets of training data. Additionally, or alternatively, the training of the primary encoding process includes training and/or tuning the encoding process and/or model using other types of data as training data. For instance, in some examples, the described systems and methods are configured to enable the encoding process and/or model to be trained at an edge of a training system and/or on a customer device or other device outside of a pre-training system. In some such examples, the data used to train the process and/or model includes image data that is specific to the customer or other entity by whom the trained process and/or model will be used (e.g., a pre-trained encoder model is provided to a customer entity that then further tunes the pre-trained encoder model using image data associated with the operations of the customer entity, such that the model is tuned to work with types of images that are specific to the customer entity).

Figure 5:
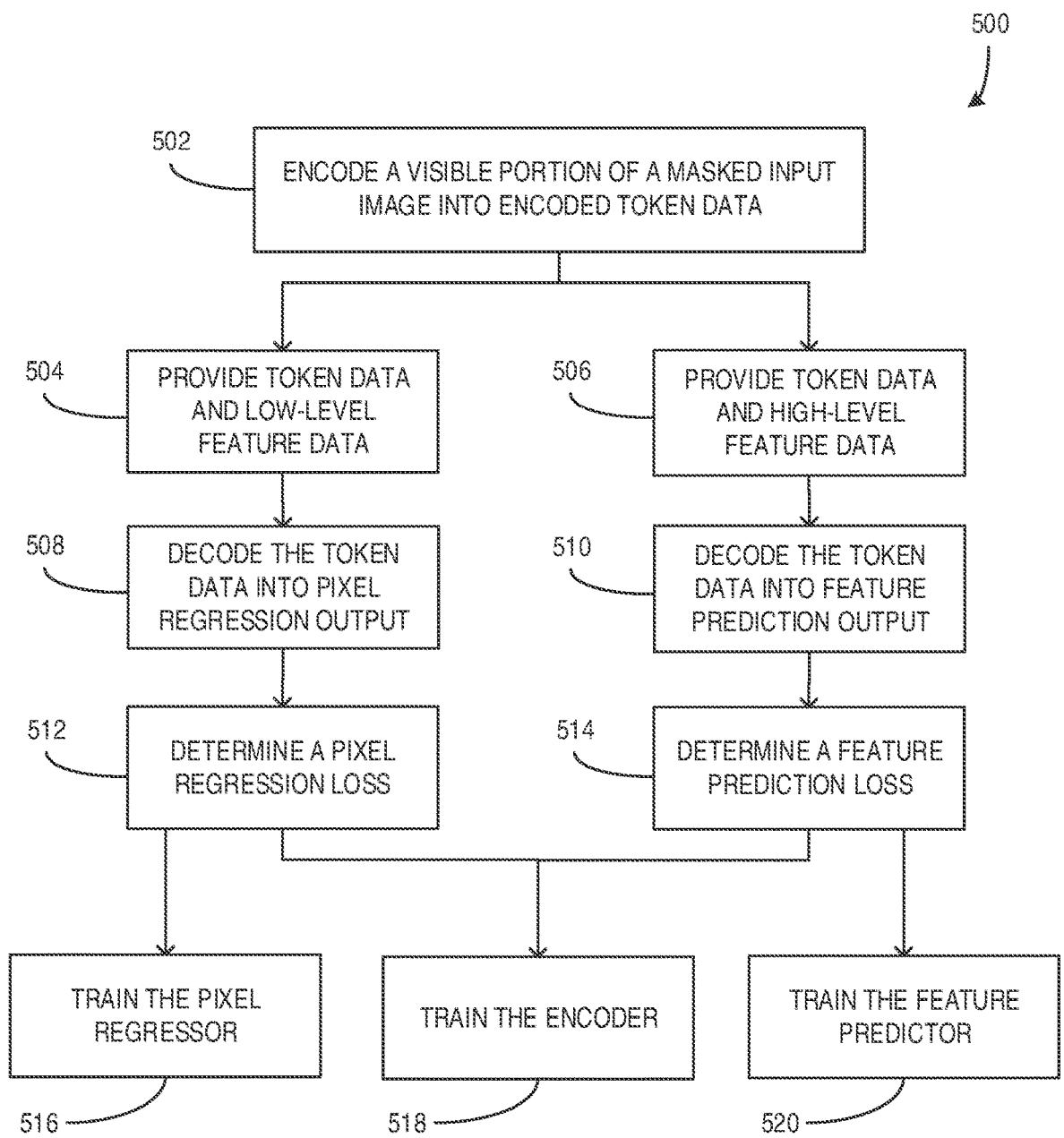
FIG. 5 is a flowchart illustrating a method for training an encoder network to inpaint images that are partially masked using feature injection with the decoding processes.

FIG. 5 is a flowchart illustrating a method 500 for training an encoder network to inpaint images that are partially masked using feature injection with the decoding processes. In some examples, the method 500 is executed or otherwise performed by a process such as processes 100 and/or 200 of FIGS. 1 and/or 2, respectively, and/or in systems such as system 300 of FIG. 3.

At 502, the visible portion of a masked input image is encoded into encoded token data using an encoding process and/or an encoder. In some examples, the encoding is performed by an encoding process such as encoding processes 110 and/or 210, and/or encoder component such as encoder 310.

At 504, encoded token data and low-level feature data are provided to a pixel regression process (e.g., pixel regression process 214) and/or pixel regressor component (e.g., pixel regressor 314). In some examples, the low-level feature data includes pixel values and/or pixel data from the visible portion of the masked input image. Additionally, or alternatively, the low-level feature data is provided to the pixel regressor from a shallow or early stage of the encoder process, such as a stage prior to the data being transformed by transformer blocks or layers of the encoder. Further, in some examples, the pixel regressor includes multiple layers that perform operations on data in series and each of the multiple players is provided the low-level feature data, providing consistent context for use in decoding the encoded tokens that is not obtained from the encoded tokens themselves.

At 506, encoded token data and high-level feature data are provided to a feature prediction process (e.g., feature prediction process 218) and/or feature predictor component (e.g., feature predictor 318). In some examples, the high-level feature data includes data reflective of multi-pixel structure from the visible portion of the masked input image. Additionally, or alternatively, the high-level feature data is provided to the feature predictor from a deep or late stage of the encoding process, such as a stage after the data is transformed by transformer blocks or layers of the encoder. Further, in some examples, the feature predictor includes multiple layers that perform operations on data in series and each of the multiple layers is provided the high-level feature data, providing consistent context for use in decoding the encoded tokens that is not obtained from the encoded tokens themselves.

At 508, the encoded token data is decoded into pixel regression output using the pixel regression process and/or pixel regressor component and, at 510, the encoded token data is decoded into feature prediction output using the feature prediction process and/or feature predictor component. At 512, a pixel regression loss is determined using the pixel regression output and pixel data from the input image and, at 514, a feature prediction loss is determined using the feature prediction output and encoded data from a momentum encoder (e.g., a ground truth momentum encoding process 122 and/or momentum encoder 322) using image data from the input image.

At 516, the pixel regressor is trained using the pixel regression loss, at 518, the encoder is trained using the pixel regression loss and the feature prediction loss, and at 520, the feature predictor is trained using the feature prediction loss. In some examples, the training of these components is performed using machine learning techniques. In some such examples, the encoder is trained to improve its capability to generate encoded token data that reflects features of input images, the pixel regressor is trained to improve its capability to inpaint pixel-level image data into masked portions of input images, and the feature predictor is trained to improve its capability to inpaint multi-pixel-level structural feature data into masked portions of input images.

ADDITIONAL EXAMPLES

In some examples, a trained encoder network (e.g., a trained encoding process 110, 220 and/or encoder 310 and decoding processes and/or decoders such as the pixel regression process 214, the pixel regressor 314, the feature prediction process 219, and/or the feature predictor 318) is provided to an entity, such as a customer, that will use the trained encoder network to generate inpainted output images (e.g., an image based on a masked input image that include the visible portion of the masked input image and inpainted image data in place of the masked portion of the masked input image). The entity that receives the trained encoder network is enabled to provide masked input images to the trained encoder network and to obtain generated inpainted output images therefrom.

Further, in some such examples, the entity is enabled to use training data in the form of masked input images for which the complete image data is available (e.g., the image data of the masked portions of the masked input images is known) to further train and/or fine-tune the trained encoder network. For instance, the entity is enabled to provide a masked input image of the training data to the trained encoder network and generate an inpainted output image using the trained encoder network. The inpainted output image can then be compared to the complete image data of the masked input image and the trained encoder network can be tuned (e.g., the parameters of the encoder process and/or decoder process(es) adjusted or otherwise changed) based on the comparison. The entity is further enabled to perform such fine-tuning iteratively using a plurality of masked input images in the training data. In some such examples, the entity uses a set of images that reflect patterns of images for which the entity will use the trained encoder network, such that the trained encoder network is fine-tuned more accurately generate inpainted output images from masked input images that are specific to the entity.

Exemplary Operating Environment

The present disclosure is operable with a computing apparatus according to an embodiment as a functional block diagram 600 in FIG. 6. In an example, components of a computing apparatus 618 are implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. In some examples, platform software comprising an operating system 620 or any other suitable platform software is provided on the apparatus 618 to enable application software 621 to be executed on the device. In some examples, training an encoder network to inpaint images including masked portions using a momentum encoder for training targets and feature injection for context-aware decoding as described herein is accomplished by software, hardware, and/or firmware.

In some examples, computer executable instructions are provided using any computer-readable media that are accessible by the computing apparatus 618. Computer-readable media include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology. Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined heroin, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that, in some examples, the storage is distributed or located remotely and accessed via a network or other communication link (e.g., using a communication interface 623).

Further, in some examples, the computing apparatus 618 comprises an input/output controller 624 configured to output information to one or more output devices 625, for example a display or a speaker, which are separate from or integral to the electronic device. Additionally, or alternatively, the input/output controller 624 is configured to receive and process an input from one or more input devices 626, for example, a keyboard, a microphone, or a touchpad. In one example, the output device 625 also acts as the input device. An example of such a device is a touch sensitive display. The input/output controller 624 may also output data to devices other than the output device, e.g., a locally connected printing device. In some examples, a user provides input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs). Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: at least one processor; and at least one memory comprising computer program code, the at least one memory and the computer program code configured to, with the at least one processor, cause the at least one processor to: encode, using a primary encoding process, a visible portion of a masked input image into encoded token data, wherein the masked input image includes the visible portion and a masked portion; decode the encoded token data into pixel regression output, the pixel regression output including inpainted image pixel data associated with the masked portion of the masked input image; decode the encoded token data into feature predictor output, the feature predictor output including inpainted image feature data associated with the masked portion of the masked input image; and train the primary encoding process using the inpainted image pixel data of the pixel regression output and the inpainted image feature data of the feature predictor output, whereby the primary encoding process is trained to encode structural features of input images into encoded token data.

An example computerized method comprises: encoding, by a processor, using a primary encoding process, a visible portion of a masked input image into encoded token data, wherein the masked input image includes the visible portion and a masked portion; decoding, by the processor, the encoded token data into pixel regression output, the pixel regression output including inpainted image pixel data associated with the masked portion of the masked input image; decoding, by the processor, the encoded token data into feature predictor output, the feature predictor output including inpainted image feature data associated with the masked portion of the masked input image; and training, by the processor, the primary encoding process using the inpainted image pixel data of the pixel regression output and the inpainted image feature data of the feature predictor output, whereby the primary encoding process is trained to encode structural features of input images into encoded token data.

One or more computer storage media having computer-executable instructions that, upon execution by a processor, cause the processor to at least: receive, by a trained encoder network, a masked input image to be inpainted, wherein the masked input image includes a visible portion and a masked portion; encode, using a primary encoding process of the trained encoder network, the visible portion of a masked input image into encoded token data; decode, using a pixel regression process of the trained encoder network, the encoded token data into pixel regression output, the pixel regression output including inpainted image pixel data associated with the masked portion of the masked input image; decode, using a feature prediction process of the trained encoder network, the encoded token data into feature predictor output, the feature predictor output including inpainted image feature data associated with the masked portion of the masked input image; and generate an inpainted output image using the inpainted image pixel data of the pixel regression output and the inpainted image feature data of the feature predictor output.

Alternatively, or in addition to the other examples described herein, examples include any combination of the following:

further comprising: determining a pixel regression loss using the pixel regression output and pixel data of an unmasked version of the masked input image; determining a feature prediction loss using the feature prediction output and ground truth encoding output of a ground truth momentum encoding process applied to the unmasked version of the masked input image; and updating, by the processor, parameters of the ground truth momentum encoding process based on an exponential moving average (EMA) of parameters of the trained primary encoding process.

wherein the pixel regression output is decoded from the encoded token data by a pixel regressor, and the feature prediction output is decoded from the encoded token data by a feature predictor; and the computerized method further comprising: training, by the processor, the pixel regressor using the determined pixel regression loss; and training, by the processor, the feature predictor using the determined feature prediction loss; wherein training the primary encoding process using the inpainted image pixel data of the pixel regression output and the inpainted image feature data of the feature predictor output includes training the primary encoding process using the determined pixel regression loss and the determined feature prediction loss.

further comprising: obtaining, by the processor, low-level feature data based on the visible portion of the masked input image from the primary encoding process; providing, by the processor, the obtained low-level feature data to the pixel regressor, wherein the provided low-level feature data is used for decoding the encoded token data into the pixel regression output; obtaining, by the processor, high-level feature data based on the visible portion of the masked input image from the primary encoding process; and providing, by the processor, the obtained high-level feature data to the feature predictor, wherein the provided high-level feature data is used for decoding the encoded token data into the feature prediction output.

wherein the low-level feature data is obtained from a portion of the primary encoding process prior to a transformation subprocess of the primary encoding process; wherein the low-level feature data is provided to each block of the pixel regressor; wherein the high-level feature data is obtained from a portion of the primary encoding process after a transformation subprocess of the primary encoding process; and wherein the high-level feature data is provided to each block of the feature predictor.

wherein the low-level feature data includes pixel value data associated with pixels of the visible portion of the masked input image.

further comprising: receiving, by the processor, an unmasked version of the masked input image; dividing, by the processor, the received unmasked version of the masked input image into a set of non-overlapping patches; and applying, by the processor, a mask to a first subset of the set of non-overlapping patches, wherein the first subset of patches is a set of masked patches and a second subset of the set of non-overlapping patches is a set of visible patches; wherein the masked portion of the masked input image includes the set of masked patches and the visible portion of the masked input image includes the set of visible patches; and wherein the encoded token data includes an encoded token for each visible patch of the set of visible patches.

wherein the trained encoder network is trained using at least: a pixel regression loss determined using the pixel regression output and pixel data of an unmasked version of the masked input image; and a feature prediction loss determined using the feature prediction output and ground truth encoding output of a ground truth momentum encoding process applied to the unmasked version of the masked input image, wherein parameters of the ground truth momentum encoding process are updated based on an exponential moving average (EMA) of parameters of the trained primary encoding process.

wherein the trained encoder network is trained to: obtain low-level feature data based on the visible portion of the masked input image from the primary encoding process; provide the obtained low-level feature data to the pixel regression process, wherein the provided low-level feature data is used for decoding the encoded token data into the pixel regression output; obtain high-level feature data based on the visible portion of the masked input image from the primary encoding process; and provide the obtained high-level feature data to the feature prediction process, wherein the provided high-level feature data is used for decoding the encoded token data into the feature prediction output.

wherein the low-level feature data is obtained from a portion of the primary encoding process prior to a transformation subprocess of the primary encoding process; wherein the low-level feature data is provided to each block of the pixel regression process; wherein the high-level feature data is obtained from a portion of the primary encoding process after a transformation subprocess of the primary encoding process; and wherein the high-level feature data is provided to each block of the feature prediction process.

wherein the masked input image includes image data associated with the masked portion of the masked input image for use as training data; and wherein the computer-executable instructions, upon execution by a processor, further cause the processor to at least train the trained encoder network based on the image data associated with the masked portion of the masked input image and the generated inpainted output image, whereby the trained encoder network is further trained to generate inpainted output images based masked input images.

wherein the masked input image is from a set of masked input image training data associated with an entity to which the trained encoder network was provided; and wherein the trained encoder network is further trained based on other masked input images of the set of masked input image training data, whereby the trained encoder network is trained to generate inpainted output images from masked input images associated with the entity.

further comprising: receiving a second masked input image; and generating an inpainted output image from the received second masked input image using the trained primary encoding process and at least one decoding process Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for encoding, by a processor, using a primary encoding process, a visible portion of a masked input image into encoded token data, wherein the masked input image includes the visible portion and a masked portion; exemplary means for decoding, by the processor, the encoded token data into pixel regression output, the pixel regression output including inpainted image pixel data associated with the masked portion of the masked input image; exemplary means for decoding, by the processor, the encoded token data into feature predictor output, the feature predictor output including inpainted image feature data associated with the masked portion of the masked input image; exemplary means for determining, by the processor, a pixel regression loss using the pixel regression output and pixel data of an unmasked version of the masked input image; exemplary means for determining, by the processor, a feature prediction loss using the feature prediction output and ground truth encoding output of a ground truth momentum encoding process applied to the unmasked version of the masked input image; and exemplary means for training, by the processor, the primary encoding process using the determined pixel regression loss and the determined feature prediction loss, whereby the primary encoding process is trained to encode structural features of input images into encoded token data.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   at least one processor; and
   at least one memory comprising computer program code, the at least one memory and the computer program code configured to, with the at least one processor, cause the at least one processor to:
   encode, using a primary encoding process, a visible portion of a masked input image into encoded token data, wherein the masked input image includes the visible portion and a masked portion;
   decode the encoded token data into pixel regression output, the pixel regression output including inpainted image pixel data associated with the masked portion of the masked input image;
   decode the encoded token data into feature predictor output, the feature predictor output including inpainted image feature data associated with the masked portion of the masked input image;
   apply a ground truth momentum encoding process to an unmasked version of the masked input image;

train the primary encoding process using the inpainted image pixel data of the pixel regression output and the inpainted image feature data of the feature predictor output, whereby the primary encoding process is trained to encode structural features of input images into encoded token data; and update the ground truth momentum encoding process based on changes made to the primary encoding process.

2. The system of claim 1, wherein the at least one memory and the computer program code is configured to, with the at least one processor, further cause the at least one processor to:

determine a pixel regression loss using the pixel regression output and pixel data of an unmasked version of the masked input image;

determine a feature prediction loss using the feature prediction output and ground truth encoding output of the ground truth momentum encoding process applied to the unmasked version of the masked input image; and update parameters of the ground truth momentum encoding process based on an exponential moving average (EMA) of parameters of the trained primary encoding process.

3. The system of claim 2, wherein the pixel regression output is decoded from the encoded token data by a pixel regressor, and the feature prediction output is decoded from the encoded token data by a feature predictor; and wherein the at least one memory and the computer program code is configured to, with the at least one processor, further cause the at least one processor to:

train the pixel regressor using the determined pixel regression loss; and train the feature predictor using the determined feature prediction loss;

wherein training the primary encoding process using the inpainted image pixel data of the pixel regression output and the inpainted image feature data of the feature predictor output includes training the primary encoding process using the determined pixel regression loss and the determined feature prediction loss.

4. The system of claim 3, wherein the at least one memory and the computer program code is configured to, with the at least one processor, further cause the at least one processor to:

obtain low-level feature data based on the visible portion of the masked input image from the primary encoding process;

provide the obtained low-level feature data to the pixel regressor, wherein the provided low-level feature data is used for decoding the encoded token data into the pixel regression output;

obtain high-level feature data based on the visible portion of the masked input image from the primary encoding process; and provide the obtained high-level feature data to the feature predictor, wherein the provided high-level feature data is used for decoding the encoded token data into the feature prediction output.

5. The system of claim 4, wherein the low-level feature data is obtained from a portion of the primary encoding process prior to a transformation subprocess of the primary encoding process;

wherein the low-level feature data is provided to each block of the pixel regressor;

wherein the high-level feature data is obtained from a portion of the primary encoding process after a transformation subprocess of the primary encoding process; and wherein the high-level feature data is provided to each block of the feature predictor.

6. The system of claim 1, wherein the at least one memory and the computer program code is configured to, with the at least one processor, further cause the at least one processor to:

receive a second masked input image; and generate an inpainted output image from the received second masked input image using the trained primary encoding process and at least one decoding process.

7. The system of claim 1, wherein the at least one memory and the computer program code is configured to, with the at least one processor, further cause the at least one processor to:

receive an unmasked version of the masked input image;

divide the received unmasked version of the masked input image into a set of non-overlapping patches; and apply a mask to a first subset of the set of non-overlapping patches, wherein the first subset of patches is a set of masked patches and a second subset of the set of non-overlapping patches is a set of visible patches;

wherein the masked portion of the masked input image includes the set of masked patches, and the visible portion of the masked input image includes the set of visible patches; and wherein the encoded token data includes an encoded token for each visible patch of the set of visible patches.

8. A computerized method comprising:

encoding, by a processor, using a primary encoding process, a visible portion of a masked input image into encoded token data, wherein the masked input image includes the visible portion and a masked portion;

decoding, by the processor, the encoded token data into pixel regression output, the pixel regression output including inpainted image pixel data associated with the masked portion of the masked input image;

decoding, by the processor, the encoded token data into feature predictor output, the feature predictor output including inpainted image feature data associated with the masked portion of the masked input image;

applying a ground truth momentum encoding process to an unmasked version of the masked input image;

training, by the processor, the primary encoding process using the inpainted image pixel data of the pixel regression output and the inpainted image feature data of the feature predictor output, whereby the primary encoding process is trained to encode structural features of input images into encoded token data; and updating the ground truth momentum encoding process based on changes made to the primary encoding process.

9. The computerized method of claim 8, further comprising:

determining a pixel regression loss using the pixel regression output and pixel data of an unmasked version of the masked input image;

determining a feature prediction loss using the feature prediction output and ground truth encoding output of the ground truth momentum encoding process applied to the unmasked version of the masked input image; and updating, by the processor, parameters of the ground truth momentum encoding process based on an exponential moving average (EMA) of parameters of the trained primary encoding process.

10. The computerized method of claim 9, wherein the pixel regression output is decoded from the encoded token data by a pixel regressor, and the feature prediction output is decoded from the encoded token data by a feature predictor; and the computerized method further comprising:
training, by the processor, the pixel regressor using the determined pixel regression loss; and
training, by the processor, the feature predictor using the determined feature prediction loss;
wherein training the primary encoding process using the inpainted image pixel data of the pixel regression output and the inpainted image feature data of the feature predictor output includes training the primary encoding process using the determined pixel regression loss and the determined feature prediction loss.

11. The computerized method of claim 10, further comprising:
obtaining, by the processor, low-level feature data based on the visible portion of the masked input image from the primary encoding process;
providing, by the processor, the obtained low-level feature data to the pixel regressor, wherein the provided low-level feature data is used for decoding the encoded token data into the pixel regression output;
obtaining, by the processor, high-level feature data based on the visible portion of the masked input image from the primary encoding process; and
providing, by the processor, the obtained high-level feature data to the feature predictor, wherein the provided high-level feature data is used for decoding the encoded token data into the feature prediction output.

12. The computerized method of claim 11, wherein the low-level feature data is obtained from a portion of the primary encoding process prior to a transformation subprocess of the primary encoding process;
wherein the low-level feature data is provided to each block of the pixel regressor;
wherein the high-level feature data is obtained from a portion of the primary encoding process after a transformation subprocess of the primary encoding process; and
wherein the high-level feature data is provided to each block of the feature predictor.

13. The computerized method of claim 11, wherein the low-level feature data includes pixel value data associated with pixels of the visible portion of the masked input image.

14. The computerized method of claim 8, further comprising:
receiving, by the processor, an unmasked version of the masked input image;
dividing, by the processor, the received unmasked version of the masked input image into a set of non-overlapping patches; and
applying, by the processor, a mask to a first subset of the set of non-overlapping patches, wherein the first subset of patches is a set of masked patches and a second subset of the set of non-overlapping patches is a set of visible patches;
wherein the masked portion of the masked input image includes the set of masked patches, and the visible portion of the masked input image includes the set of visible patches; and wherein the encoded token data includes an encoded token for each visible patch of the set of visible patches.

15. One or more computer storage media having computer-executable instructions that, upon execution by a processor, cause the processor to at least:
receive, by a trained encoder network, a masked input image to be inpainted, wherein the masked input image includes a visible portion and a masked portion;
encode, using a primary encoding process of the trained encoder network, the visible portion of a masked input image into encoded token data;
decode, using a pixel regression process of the trained encoder network, the encoded token data into pixel regression output, the pixel regression output including inpainted image pixel data associated with the masked portion of the masked input image;
decode, using a feature prediction process of the trained encoder network, the encoded token data into feature predictor output, the feature predictor output including inpainted image feature data associated with the masked portion of the masked input image;
apply a ground truth momentum encoding process to an unmasked version of the masked input image;
generate an inpainted output image using the inpainted image pixel data of the pixel regression output and the inpainted image feature data of the feature predictor output;
train the trained primary encoding process using the inpainted image pixel data of the pixel regression output and the inpainted image feature data of the feature predictor output; and
update the ground truth momentum encoding process based on changes made to the trained primary encoding process.

16. The one or more computer storage media of claim 15, wherein the trained encoder network is trained using at least:
a pixel regression loss determined using the pixel regression output and pixel data of an unmasked version of the masked input image; and
a feature prediction loss determined using the feature prediction output and ground truth encoding output of the ground truth momentum encoding process applied to the unmasked version of the masked input image, wherein parameters of the ground truth momentum encoding process are updated based on an exponential moving average (EMA) of parameters of the trained primary encoding process.

17. The one or more computer storage media of claim 16, wherein the trained encoder network is trained to:
obtain low-level feature data based on the visible portion of the masked input image from the primary encoding process;
provide the obtained low-level feature data to the pixel regression process, wherein the provided low-level feature data is used for decoding the encoded token data into the pixel regression output;
obtain high-level feature data based on the visible portion of the masked input image from the primary encoding process; and
provide the obtained high-level feature data to the feature prediction process, wherein the provided high-level feature data is used for decoding the encoded token data into the feature prediction output.

18. The one or more computer storage media of claim 17, wherein the low-level feature data is obtained from a portion of the primary encoding process prior to a transformation subprocess of the primary encoding process;

wherein the low-level feature data is provided to each block of the pixel regression process;

wherein the high-level feature data is obtained from a portion of the primary encoding process after a transformation subprocess of the primary encoding process; and wherein the high-level feature data is provided to each block of the feature prediction process.

19. The one or more computer storage media of claim 15, wherein the masked input image includes image data associated with the masked portion of the masked input image for use as training data; and wherein the computer-executable instructions, upon execution by a processor, further cause the processor to at least train the trained encoder network based on the image data associated with the masked portion of the masked input image and the generated inpainted output image, whereby the trained encoder network is further trained to generate inpainted output images based masked input images.

20. The one or more computer storage media of claim 19, wherein the masked input image is from a set of masked input image training data associated with an entity to which the trained encoder network was provided; and wherein the trained encoder network is further trained based on other masked input images of the set of masked input image training data, whereby the trained encoder network is trained to generate inpainted output images from masked input images associated with the entity.

* * * * *